United States Patent
Kek et al.

[11] Patent Number: 6,072,860
[45] Date of Patent: Jun. 6, 2000

[54] TELEPHONE APPARATUS WITH RECORDING OF PHONE CONVERSATIONS ON MASSIVE STORAGE

[75] Inventors: Chang W. Kek; Kenneth A. Salter; Daniel W. Cravey, all of Mobile, Ala.

[73] Assignee: **Global Tel*Link Corp.,** Mobile, Ala.

[21] Appl. No.: 09/149,146

[22] Filed: Sep. 8, 1998

Related U.S. Application Data

[62] Division of application No. 08/587,084, Jan. 16, 1996.

[51] Int. Cl.[7] .................................................... H04M 1/64
[52] U.S. Cl. ...................................... 379/88.25; 379/67.1
[58] Field of Search ............................... 379/67.1, 88.19, 379/88.2, 88.21, 88.22, 88.25, 88.26, 88.27, 93.02, 93.03, 111, 112, 113, 114, 118, 127, 142, 201

[56] References Cited

U.S. PATENT DOCUMENTS

| | | | |
|---|---|---|---|
| 5,355,403 | 10/1994 | Richardson, Jr. et al. | 379/88 |
| 5,524,142 | 6/1996 | Lewis et al. | 379/112 |
| 5,533,103 | 7/1996 | Peavey et al. | 379/67.1 |
| 5,535,261 | 7/1996 | Brown et al. | 379/67 |
| 5,590,171 | 12/1996 | Howe et al. | 379/1 X |
| 5,596,632 | 1/1997 | Curtis et al. | 379/189 |
| 5,655,013 | 8/1997 | Gainsboro | 379/188 |
| 5,745,558 | 4/1998 | Richardson, Jr. et al. | 379/189 |
| 5,751,791 | 5/1998 | Chen et al. | 379/88 |

*Primary Examiner*—Scott Weaver
*Attorney, Agent, or Firm*—Frishauf, Holtz, Goodman, Langer & Chick, P.C.

[57] ABSTRACT

A telephone apparatus for providing service to a plurality of telephones located at a particular facility, and with the capability of controlling the connection of calls to such telephones as well as recording selected phone conversations. In particular, control of call connection is accomplisued with access control data that is phone-related and PIN number-related. Phone-related data activates the telephone based on, for example, its location in the facility, time of day and day of the week. PIN number-related data allows access to the phone depending on data associated with the caller to whom a unique PIN number has been assigned. The recording of conversations is controllable based on a comparison of call-related data, particular to the call being attempted, with stored recording control data that may also be phone-related and/or PIN number-related.

14 Claims, 6 Drawing Sheets

TELEPHONE APPARATUS WITH RECORDING OF PHONE CONVERSATIONS ON MASSIVE STORAGE

This is a division of application Ser. No. 08/587,084 filed Jan. 16, 1996.

FIELD OF THE INVENTION

The present invention is directed to a telephone apparatus that includes a phone system installed at a facility for providing service to its telephones and, in particular, to facilitate recording of phone conversations and the selective retrieval thereof.

It is common knowledge that telephone service is typically provided by a telephone company which provides lines extending to a telephone from a centralized switching system and other apparatus required for enabling that telephone to communicate with the public switched telephone network (PSTN). However, when a plurality of telephones is used by some entity at a particular location, referred to herein as a "facility", the entity may want to exert control over its telephones rather than leaving it entirely in the hands of the telephone company. A phone system is provided for the facility to which all of its telephones are connected and a desired number of outside lines are provided by the telephone company in order to enable communication with the PSTN. However, the phone system controls and monitors access by each telephone to the PSTN.

Such phone systems are well known. They range from relatively simple ones to rather sophisticated configurations, and are used in a variety of facilities. One type of facility which requires a sophisticated setup is a prison which typically includes a number of cell blocks. Inmates in the various cell blocks are permitted telephone privileges which can vary, by cell block, depending on such factors as time of day, day of the week, holiday/weekend, date, duration of call, numbers that are permitted to be called or numbers that are blocked, maximum number of calls per time period (e.g. per day), maximum total duration of all calls made per time period (e.g., per day) and so on. The phone system must be capable of such access control. Moreover, monitoring of data associated with phone calls made from a particular telephone or telephones is desirable in order to store such information for later retrieval and use, as needed.

A particularly useful feature of a phone system installed at a facility such as a prison is the capability to record the phone conversations of the inmates. The phone system must provide some degree of control over which conversations are recorded and which are not because, for example, a call placed to an inmate's attorney is considered privileged. The phone system should also have a way of facilitating retrieval of a particular call which may in the future be of interest to the prison authorities and/or the police, for example.

Phone systems are known which have a phone conversation recording capability. However, such known phone systems have several shortcomings. For example, the level of access control and/or monitoring that is available is relatively low because it is based on the extent to which a particular telephone can be connected with the PSTN. However, several inmates are typically serviced by one telephone. Thus, a higher level of control and/or monitoring is desirable which is personalized to each one of the inmates. Also, control of which phone conversation is recorded should be at the higher, individual inmate level rather than being telephone-based. In addition, when the phone conversations are stored, it should be done in such a way so as to facilitate retrieval thereof, and with respect to individual inmates. Known phone systems record the phone conversations on media with an inadequate storage capacity to conduct a search over an appreciable period of time (e.g. week, month), and the search cannot be conducted with respect to an individual inmate. Furthermore, known phone systems cannot accurately and reliably record the number dialed by the inmate (i.e. the destination number) and, therefore, its value for later use as a search tool is questionable. This is because the recording system relies upon picking up from the outside lines the DTMF tone signals produced by the phone system. However, such signals can include extraneous signals, such as the number "9" required to access an outside line, and different phone systems use various signalling schemes. Therefore, it is difficult to pick out the DTMF tones which apply to the destination number unless the recording system is customized for the signalling scheme of the phone system with which it is used.

SUMMARY OF THE INVENTION

One object of the invention is to facilitate the use of a phone system located at a facility to record phone conversations originating from any of its telephones.

Another object of the invention is to facilitate the selected retrieval of phone conversations recorded by the phone system.

A further object of the invention is to control access by individual telephone users to the PSTN.

Yet another object of the invention is to control the recording of phone conversations based on the identity of individual telephone users.

Still another object of the present invention is to determine the destination number accurately and store it for later use.

These and other objects of the invention are attained in accordance with one aspect of the invention which is directed to a telephone system for communicating telephones located at a facility with a public switched telephone network (PSTN). A switching means connects the telephones with the PSTN. Access control data is provided which includes phone-related data and PIN number-related data. Control means actuates the switching means in accordance with the access control data.

Another aspect of the invention is directed to a telephone appratus for communicating telephones located at a facility with the PSTN. A phone system is located at the facility, including switching means for connecting the telephones with the PSTN. Access control data is provided which includes phone-related data and PIN number-related data. Control means actuates the switching means in accordance with the access control data. A computerized central office is located remotely from the facility. A computer workstation is located at the facility along with a computer file server, a computerized recording system and means for communicating the central office, workstation, file server and recording system.

Yet another aspect of the invention is directed to a telephone apparatus for controlling access by telephones located at a facility to the PSTN and recording selected phone conversations. Means is provided for storing access control data and recording control data. Call-related data particular to an attempted call being made from one of the telephones is provided. A phone system is located at the facility, including access control means for providing selected access from the one telephone to the PSTN by connecting the attempted call based on a comparison of the access control data with the call-related data. Recording means is coupled to the phone system for recording conversation data generated when an attempted call has been connected to the PSTN. Recording control means selects which connected calls are to be recorded based on a comparison of the call-related data with the recording control data. Storage means stores the conversation data of connected calls selected to be recorded.

DETAILED DESCRIPTION OF THE INVENTION

Figure 1:
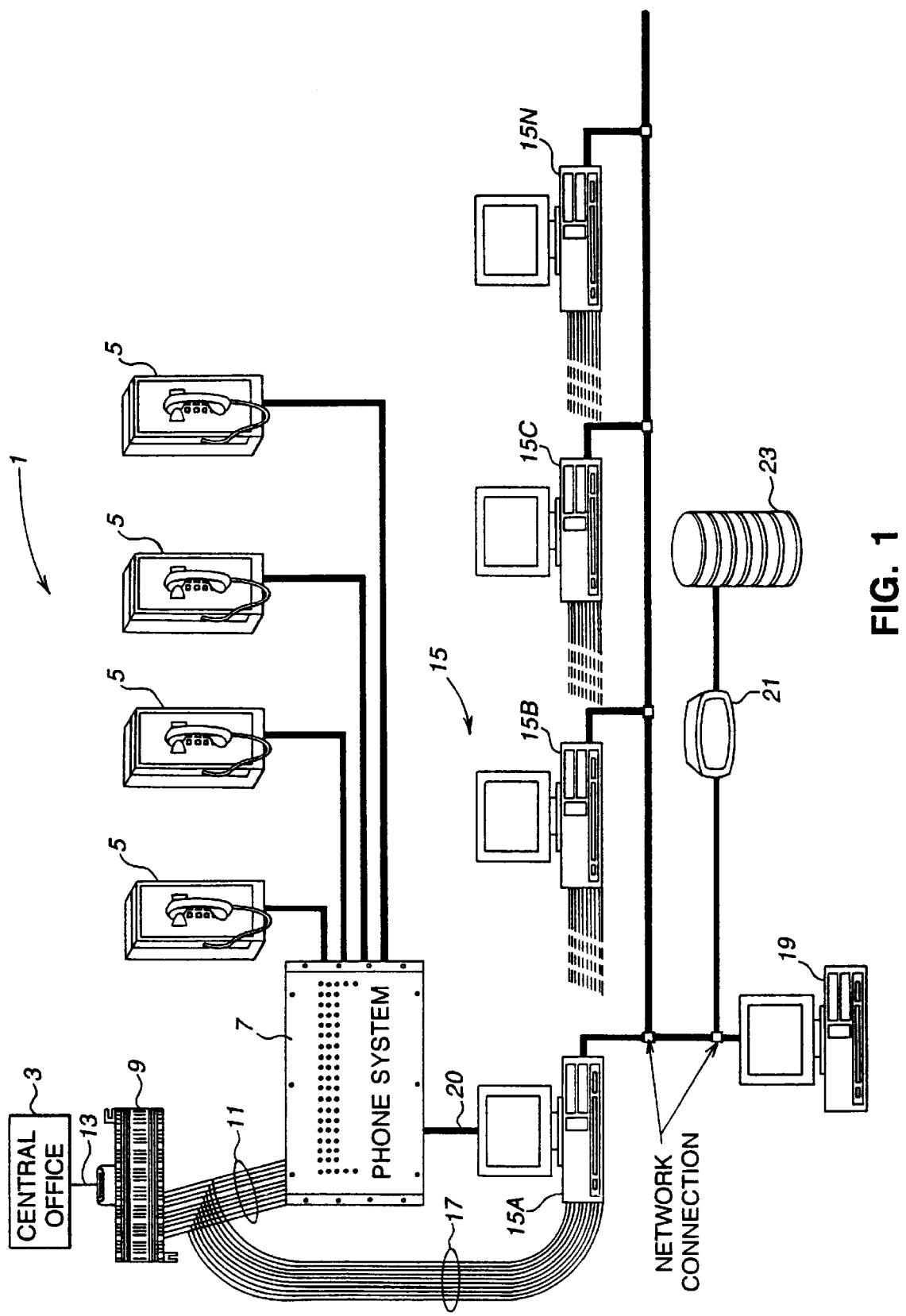
FIG. 1 is a schematic block diagram of a phone system arranged in accordance with the invention.

An overall description of the invention will be provided first, then followed by a detailed explanation of the preferred embodiments. Several main components are required to form the telephone apparatus about to be described. Of course, one component is the above-discussed phone system installed at a facility to provide access control for the telephones located there. The phone system of the facility operates in conjunction with a central office which is remote from the facility, perhaps even hundreds or thousands of miles away. The central office handles many such facility phone systems. Another of the main components is a computer workstation located at the facility. This is a PC-based apparatus with a variety of tasks, primarily in the nature of an interface. A recording system is another of the main components. It is also located at the facility. Finally, a file server with mass storage is also located at the facility to complete the telephone apparatus.

As can be ascertained from the above, the facility accommodates the workstation, phone system, recording system and the file server with mass storage. These are all networked together. The workstation is utilized as an interface to the telephone system to enter data for controlling access by the telephone, and individual users thereof, to the PSTN. The workstation is also an interface to the recording system in order to control which phone conversations are recorded. In addition, the workstation is utilized to retrieve data from the file server and its mass storage.

The remotely-located central office provides a variety of services for the facility. The facility phone system and the central office are in communication through the PSTN by modem or through a direct wire. In either case, a connection between the central office and the facility phone system can be made as and when the need arises. Such a need arises in the following ways.

When access from a phone to the PSTN is sought by a caller, whether or not the call will be connected is a decision made by the central office. More specifically, when an inmate (in the prison example being used) wishes to make a telephone call, he will pick up a telephone and enter the multi-digit personal identification number (PIN number) which was assigned to him. At that point, the facility phone system will call the central office to communicate this information. The central office will perform a two-part validation check. The first part determines, based on phone-related data and PIN number-related data that it has previously received from the workstation via the facility phone system, whether based on the phone-related data the particular phone being used is within its activated time period, and whether based on the PIN number-related data the inmate qualifies for the requested call. In particular, such PIN number-related data reveals (1) whether the owner of the PIN number is permitted to use the phone now and (2) does the owner of the PIN number have the privilege of accessing the destination number. If so, then the call has passed one part of the validation check. The second part of the validation check determines whether the destination number is a billable number. This is important because the call must be paid for. The inmate typically does not pay for the call (although a pre-payment arrangement is available). The call normally must be made on a collect call basis. However, this creates the possibility of fraud if, for example, the destination number belongs to a pay phone. Thus, at this point the central office dials a service provider (such as SNET, TNS) that maintains a data base which can be used to ascertain whether the destination number is billable. If so, then both parts of the validation check have been satisfied, and the call is connected. In addition to performing validation checks, the central office also performs maintenance, billing, housekeeping and various other functions which are not directly pertinent to a description of the invention.

Just before the call is connected following the successful completion of a validation check, the recording system determines whether this call should be recorded. Recording control data is provided to the recording system from the file server, where it was previously stored by the workstation, and this data is compared with the call-related data (e.g., the origination number, PIN number, destination number). If the conditions set by the recording control data are met, then the conversation is recorded. When the call is ended, the recorded conversation data is transferred, or migrated, to the file server. The conversation data is stored together with the call-related data and other data useful to facilitate locating and retrieving a particular conversation. When the need for retrieving a particular conversation arises, certain search parameters are manually entered into the workstation which then communicates with the file server to identify and locate the conversation in storage. The specified conversation is then retrieved and made available on the workstation for display and/or audio playback.

A detailed explanation of the invention will now be provided.

FIG. 1 depicts telephone apparatus 1 as including central office 3 located remote from the facility. At the facility, a plurality of telephones 5 are connected to phone system 7. Switching system 9 schematically depicts a centralized switching system and associated hardware and software of a telephone company which provides a plurality of outside telephone lines 11 to phone system 7 for accessing the PSTN. One telephone line 13 schematically represents the connection of phone system 7 to central office 3 via the PSTN.

Phone system 7 is connected to recording system 15. Recording system 15 is a multiple channel type and each channel is connected by one of lines 17 to one of the external lines 11. Recording system 15 has a master recording unit 15A with a maximum capacity of 48 channels. If additional capacity is required, then units 15B, 15C . . . 15N (N being any integer) can be added, each of which adds a 48 channel capacity.

Workstation 19 is networked to the recording system 15 as well as to file server 21. File server 21 is a PC with its own storage device such as a hard disk of specified capacity. However, mass storage for file server 21 is available in the form of a readable/writable optical juke box 23.

One implementation available for phone system 7 is Guardian 1600 available from Schlumberger Global Tel*Link in Mobile, Ala.

Master unit 15A of recording system 15 utilizes a PC with a Pentium 60 or MHz higher processor running OS/2 or Windows NT operating software. A 1 Gig or larger hard disk is used.

Each of units 15B . . . 15N of recording system 15 has the same hardware and software as master unit 15A, except that its software is configured to operate as a slave.

Workstation 19 is a PC with a X486 processsor or higher, running Windows, Windows 95 or Windows NT operating software on it.

File server 21 is a PC based Novell 3.12 server or a Windows NT 3.51 server, with a 1 Gig or larger capacity hard disk and a mass storage device, namely optical juke box 23.

Juke box 23 is model number MaxLyb26XT available from MAXOPTIX Corp. of Fremont, Calif. Its storage capacity is 26 Gig, but other sizes are available.

The network is Ethernet.

In one embodiment of the invention, phone system 7 is connected to recording system 15 by line 20 in the form of an RS-422 connection. This connection is used for the purpose of transferring call-related data from the phone system 7 so that it can be compared with recording control data obtained from file server 21 to determine whether or not a phone conversation will be recorded. Further details in this regard are provided below. For another embodiment of the invention, phone system 7 and recording system 15 are not connected by line 20. Instead, call-related data is obtained by recording system 15 from outside lines 11 via lines 17. Further details on this embodiment are provided below.

Figure 2:
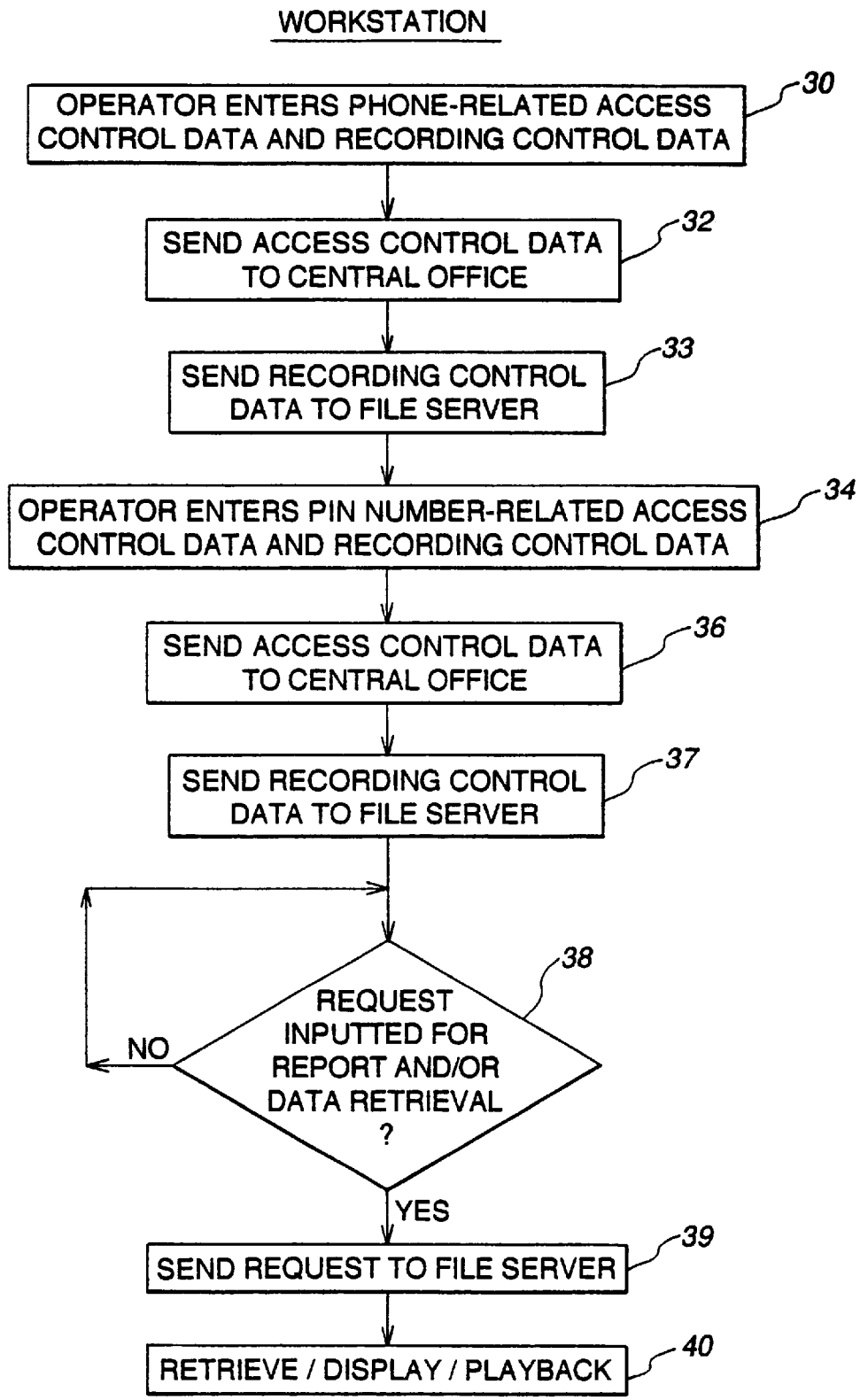
FIG. 2 is a flow chart for operating the work station of FIG. 1.

FIG. 2 is a flowchart for operating workstation 19. The operator of workstation 19 enters access control data which is to be utilized to conduct a validation check when an inmate picks up a telephone to place a call. The access control data is of two types, namely phone-related and PIN number-related.

The phone-related data is used to determine whether the telephone is active so that a call connection can be made, independent of the particular inmate that is placing the call. Thus, it may be desirable to have a particular phone, or a group of phones such as those in a particular cell block, controlled so that calls can only be placed therefrom during certain hours of the day and only on certain days (e.g. days of the week, weekends, holidays). Moreover, a maximum duration for each phone call placed from that phone can be set so that a phone is not monopolized by one call.

In addition to entering the access control data, the workstation operator must enter the recording control data which determines whether or not particular phone conversations will be recorded. The recording control data can also be of two types, namely telephone-related and PIN number-related. With the telephone-related recording control data, it is possible to record calls made from particular ones of telephones 5 based on such parameters as the origination number, destination number, time of day, day of the week, etc. Of course, this is independent of the identity of the particular inmate placing the call. However, it may also be desirable to record conversations depending on which particular inmate is placing the call. For this purpose, PIN number-related data is entered in association with the inmate PIN number.

The phone-related access control data and recording control data are entered per step 30 when the phone system of a facility is installed and as the need for changes occur.

This phone-related access control data is transmitted to central office 3 per step 32. This can be done either on a real time basis as each change is made, or it can be done as a batch transmission for a plurality of changes and done at predesignated times, such as during off hours. The access control data is stored in the central office 3 for carrying out the phone-related validation.

In step 33, the phone-related recording control data is sent to file server 21 from where it is retrievable by recording system 15. The retrieved recording control data is used for determining whether a call conversation should be recorded, as discussed above and explained in further detail below.

PIN number-related access control data and PIN number-related recording control data are entered upon the admission of an inmate, per step 34. Each inmate is assigned a PIN which is a unique multi-digit number and/or alphabetic characters. Additional data is entered in association with the PIN number to control access by that inmate to telephone privileges based on such parameters as time of day, day of the week, weekend/holiday, and so on. In addition, restrictions can be placed on the maximum duration of any phone call made by that inmate as well as on the total amount of telephone time spent by that inmate on calls made per day, per week, and so on. It is also possible to control the particular destination numbers to which the inmate can have access. This can be done by either storing a list of telephone numbers which are the only numbers to which the inmate can place calls, or allowing the inmate to call any number except for a list of numbers that are stored to which access will be denied. All of the access control data is manually entered by the operator into the workstation 19 and stored there.

Step 34 also depicts the entry of the PIN number-related recording control data. The recording control data that is PIN number-related provides control based on such parameters as the destination number, origination number, time of day, day of week, etc.

It is also important to inhibit recording of certain phone conversations for legal-reasons and perhaps other reasons as well. For example, calls made by an inmate to his attorney are considered privileged and, thus, recording thereof is forbidden by law. Thus, the recording system must be set up so as to avoid having a call made to that particular destination number recorded.

Once the PIN number-related access control data is entered, it is sent to central office 3 per step 36. This can be done in real time or by batch processing.

The PIN number-related recording control data is sent to file server 21, per step 37.

When it is desired to retrieve information from file server 21, workstation 19 is utilized for this purpose. Such information can be, for example, in the form of a report or it can be a recorded phone conversation. Examples of reports that can be provided are those sorted by any one of the following: origination number, destination number, PIN number, frequency, call duration, and group of phones (e.g. by cell block). The information included in the report is that used for sorting and any and all other call data fields that are available by virtue of having been stored.

The applicable search parameters are entered into workstation 19 to form a request when retrieval of a recorded phone conversation is desired, as per step 38. As will be explained in greater detail below, each phone conversation is stored along with any or all of the call-related data, and possibly other data, and the search parameters that can be used correspond thereto. This includes the origination number (i.e. the telephone number from which the call was placed), the destination number, the PIN number, the time of day and the day of the week, the date, and so on. The search request, as based on the search parameters that are specified by workstation 19, is sent per step 39 to the file server 21 which carries out the search through the conversation data that is stored in juke box 23. An advantage of having such a mass storage device is the convenience of being able to search through such a massive amount of data without having to interrupt the search by removing one storage medium, such as a hard disk or tape, and replacing it with another. This provides the requested data instantaneously.

A report of all of the phone conversations that fit the designated search parameters is prepared by the file server and can be called up for display by workstation 19. A decision by the operator can then be made as to which one of the listed conversations is to be played back. Once such a selection is made, such as by clicking on the desired call of interest, the file containing the conversation data is retrieved from juke box 23, and transferred to work station 19 which is provided with audio capabilities. The conversation data is then utilized for audio playback purposes so that the recorded phone conversation can be listened to. Step 40 generally depicts the retrieval of data by workstation 19 and the display thereof (in the case of a report) and/or playback thereof (in the case of a phone conversation).

Figure 3:
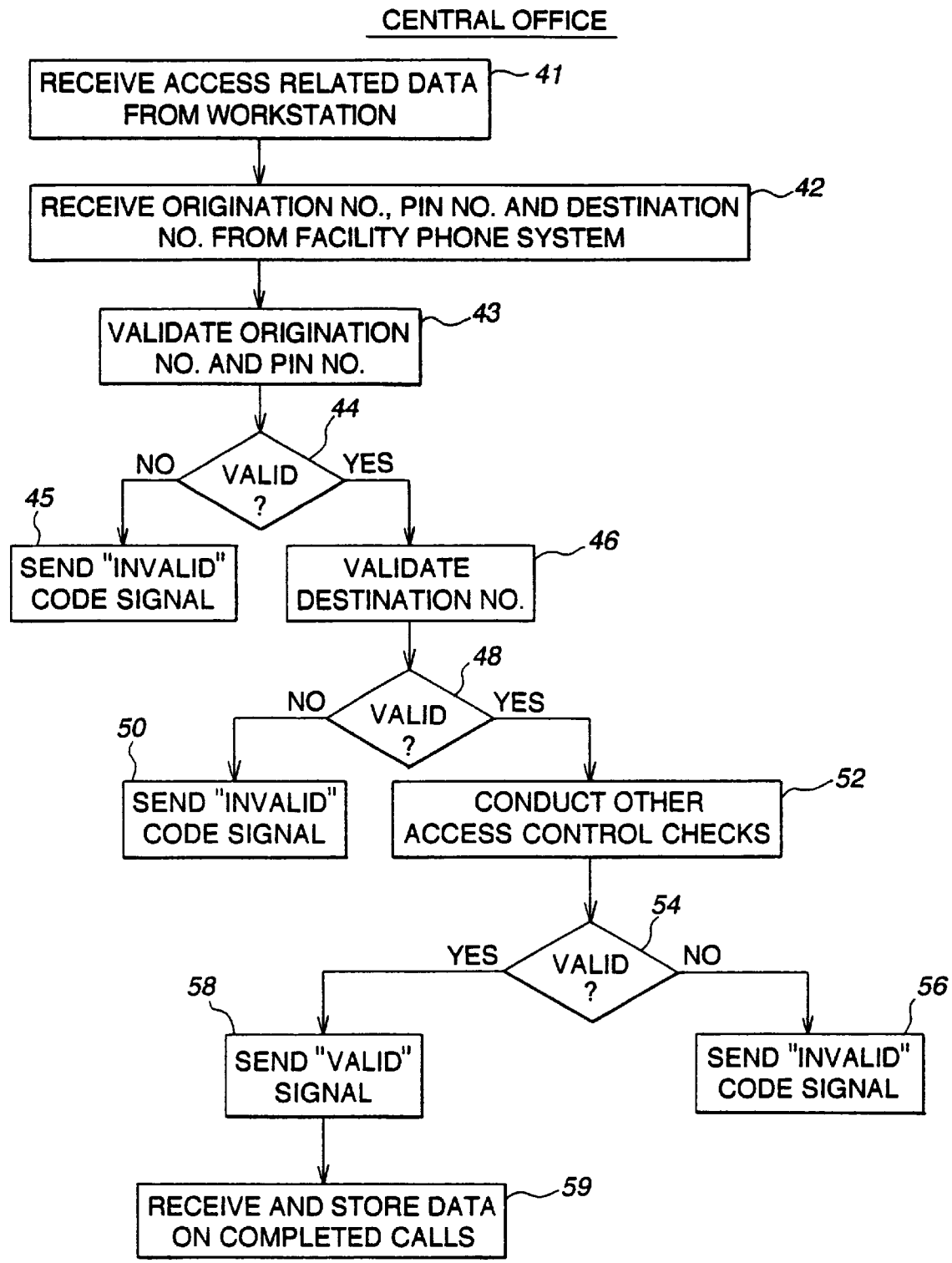
FIG. 3 is a flow chart for operating a central office with which the phone system of FIG. 1 communicates and interacts.

FIG. 3 is a flowchart for central office 3. In step 41, the central office receives from workstation 19 all of the access related data that was stored by the operator. This includes phone-related data and PIN number-related data originally derived from steps 30 and 34 of FIG. 2. This data is permanently stored in central office 3 and available for use as part of the validation check. When an inmate attempts to place a call, the number of the telephone being used (origination number), the inmate's PIN number and the destination number are transmitted to central office 3, as per step 42.

Step 43 checks whether or not the particular telephone being used is active and whether the inmate identified by the PIN number has access to telephone privileges at that particular time and under the then prevailing conditions (e.g. maximum total calling time per day not exceeded). Based on the result of step 43, step 44 determines whether the origination number and PIN number are valid. If not, then step 45 sends an "invalid" code signal to phone system 7. A particular code is used depending on the reason for the invalid status. As a result of receiving such a code, a suitable message will be produced by phone system 7 to inform the inmate that the attempted call is being denied. In addition, the message explains the reason for the denial (i.e., depending on the code, either that the particular telephone is not available at that time or that the telephone privileges for the PIN number are not then available).

If the validity of the origination number and the pin number checks out per steps 43 and 44, then the destination number must be validated as well. The destination number is received from phone system 7 by central office 3 together with the origination number and PIN number as part of step 42. The destination number is checked, per step 46, by reliance on a service provider utilized for this purpose (e.g. SNET, TNS). These service providers maintain a data base which can be used for the purpose of verifying that the destination number is billable. Thus, central station 3 accesses the service provider, such as via modem, to request this information. If step 48 indicates that, based on step 46, the destination number is not billable, then, per step 50, a unique code signal is sent by central office 3 to the phone system 7. Phone system 7 will respond to receipt of such a code by producing a suitable message to inform the inmate of the problem behind the call being denied. If, however, step 48 indicates that the destination number is billable, then step 52 conducts other access control checks. One such check is whether a dollar threshold of calls billed by this PIN number to a particular telephone number has been exceeded per specified period (e.g. a one month billing period). Another check is whether a maximum limit on the number of calls by one PIN number has been exceeded in, say, 24 hours. A further check determines whether a threshold of collect call refusals by one particular telephone number for calls attempted by this PIN number has been exceeded. This is designed to avoid annoyance calls. If step 52 determines that, based on step 52, the call should be denied, then step 56 sends a unique "invalid" signal to phone system 7 which will trigger an appropriate voice message. If, however, step 54 validates the call, then step 58 sends a "valid" signal to phone system 7 which will enable the call to be connected, thereby granting access for the inmate to the PSTN.

Finally, step 59 of FIG. 3 represents the receipt of completed call data from phone system 7. This data includes the origination number, the PIN number, the destination number, the date, the start time of the call, the completion time, the duration, etc. This completed call data is stored by central office 3 and is used for billing purposes, for example. It is sent upon completion of the call or as a batch transmission, depending on how quickly the information is needed at the central office.

Figure 4:
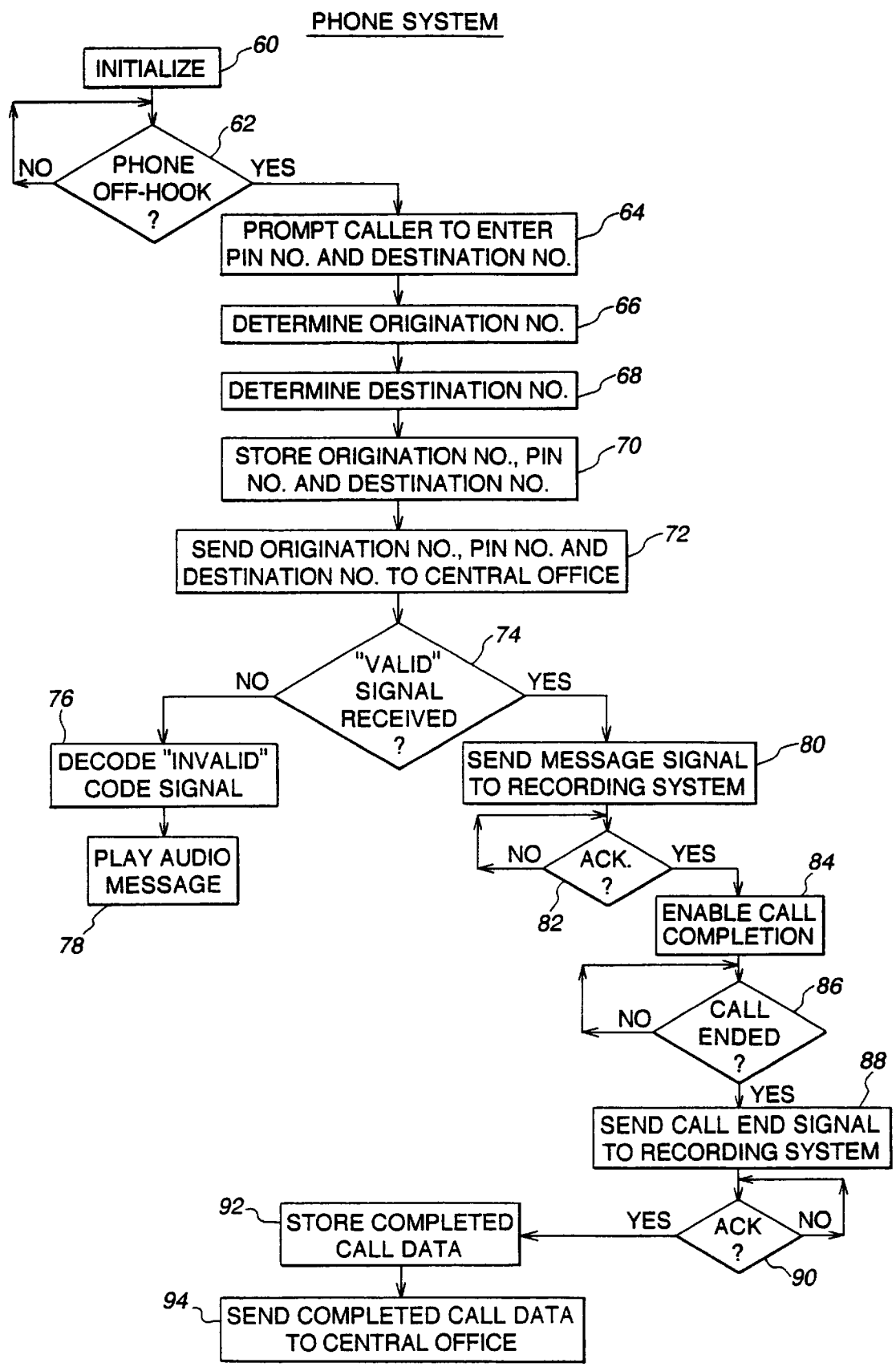
FIG. 4 is a flow chart for operating the phone system of FIG. 1.

Turning now to FIG. 4, it is a flow chart for phone system 7. Step 60 represents initialization of the system such as, for example, by entering time of day and date. Various other operations can be included in step 60 which are required to place the facility in a mode in which telephone access to the PSTN is available via phone system 7 through use of telephones 5. In step 62 a determination is made whether one of phones 5 has been taken off hook. If so, phone system 7 produces audio (e.g., voice) prompts to inform the inmate that his PIN number and the destination number must be entered, and how to do so (e.g., depress the * key after each number). Step 64 generally represents all such prompts, although it should be understood that a separate prompt can be used after each number is entered. The origination number is determined per step 66. Phone system 7 "knows" the origination number because it detects which of the lines from its telephone 5 has gone off-hook, and because a stored table relates each line to a particular telephone number.

The inputted destination number is determined by the phone system 7 per step 68. This is done by detecting the DTMF tones produced by the telephone and converting them to the corresponding numbers. The technique for performing this conversion is well known and, therefore, no details are deemed necessary. Step 70 stores the origination number, PIN number and destination number. Once all of the call-related data has been obtained and stored by phone system 7, step 72 initiates a communication mode with central office 3 and sends the origination number, PIN number and destination number thereto. Step 74 determines whether a "valid" signal has been received from central office 3 indicating that the origination number, PIN number data and destination-number have been validated by the central office. If not, then based on which of the "invalid" code signals has been received from central office 3, as determined by step 76, a suitable audio message is played per step 78 to inform the inmate of the problem. If, however, the "valid" signal is received, then step 80 sends a call-start signal to the recording system 15. In addition, the call-related data that has been stored by phone system 7 is provided to recording system 15 as part of an electronic message signal that also includes a call start signal, for reasons to be explained in detail below having to do with whether or not the conversation of this phone call will be recorded. Step 82 then awaits receipt of an acknowledgement signal from recording system 15 that the call start signal and the call-related data have been successfully transferred. If no such acknowledgement signal is received within a given period of time, then the message including the call-related data and call start signal will be retransmitted. If no acknowledgement signal is received despite several attempts having been made (a maximum number of attempts is set to avoid an endless loop), then the call will be blocked and a suitable audio message will be played, such as that the system is temporarily out of order. (This step is not shown to keep the drawing from being unduly complex.)

If an acknowledgement signal is received, then step 84 allows the call connection to be completed so that a phone conversation can take place. Following the initiation of the conversation, step 86 monitors whether the call has ended, or been terminated. This step can include monitoring whether the phone is placed on hook as well as monitoring the access control data which sets a maximum duration for a call placed from this telephone and/or by this inmate. Thus, if the telephone has not been placed on hook, at a specified time (e.g. 60 seconds) before the call is due to be terminated, phone system 7 provides an audio warning message in the form of a beep or by voice. (This step is not shown.)

Step 88 sends a call end signal to recording system 15 once the call is ended by the phone being placed on hook or by termination due to one of the designated time limits (e.g. call duration, total calls duration) having been exceeded. Step 90 determines whether an acknowledgment signal from recording system 15 has been received. If not, then another attempt (a maximum number of attempts is set to avoid an endless loop) is made to send the call end signal. Once the acknowledgement signal is received, then step 92 stores the completed call data. In step 94, phone system 7 moves the completed call data to central office 3 at a suitable time (real time or batch).

Figure 5:
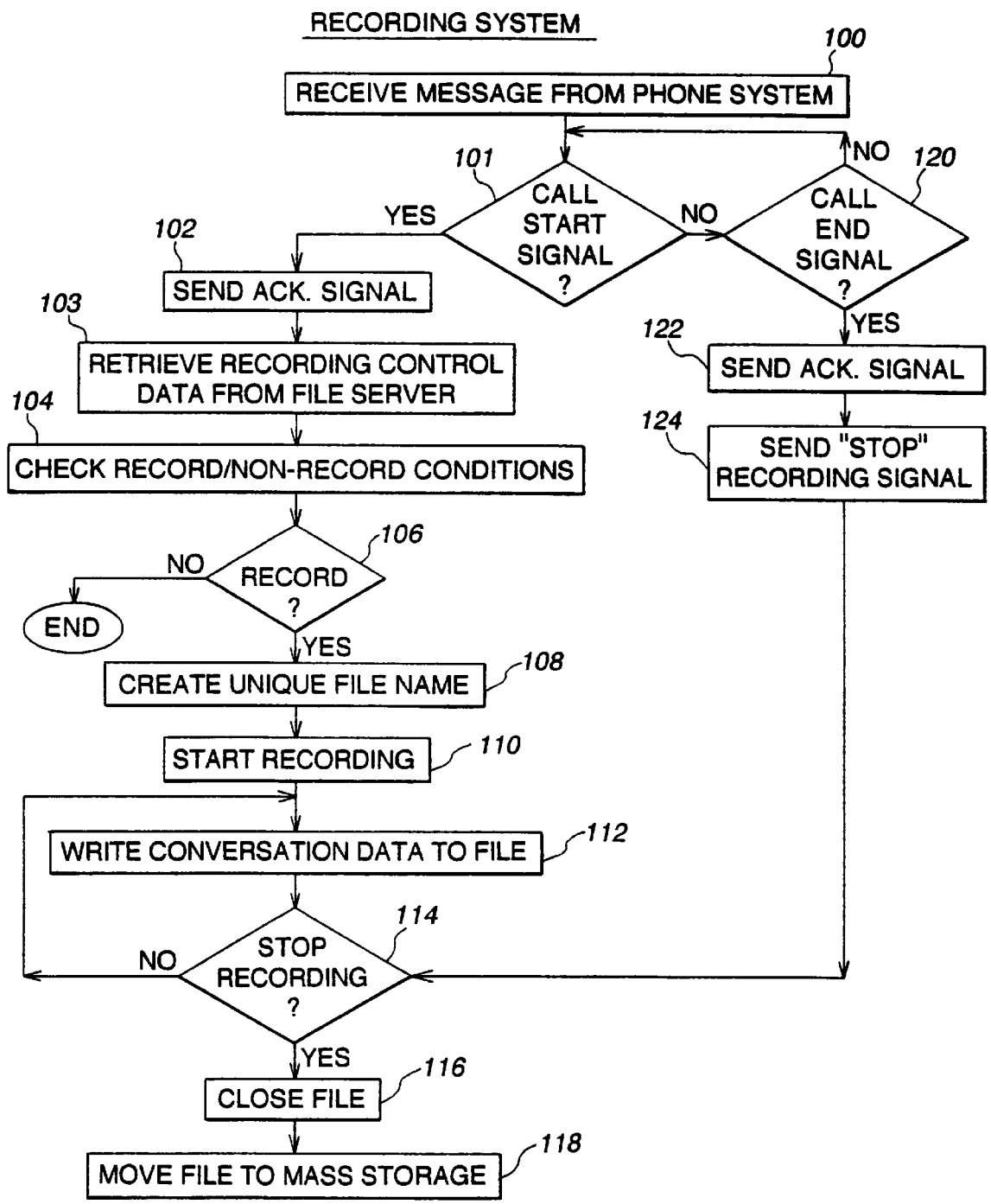
FIG. 5 is a flow chart for operating the master recording unit of the recording system shown in FIG. 1.

A flow chart for recording system 15 is shown in FIG. 5. Step 100 receives the message signal produced by step 80 (FIG. 4). Step 101 determines whether a call start signal has been received from phone system 7 as part of the electronic message signal. If it has, then step 102 sends an acknowledgement signal to phone system 7. Step 103 retrieves the previously stored recording control data from file server 21. Of course, the retrieved data is pertinent to the origination number and PIN number. Step 104 then conducts a comparison between the recording control data that it receives from file server 21 and the call-related data that it receives from phone system 7. Based on this comparison, step 106 determines whether the conversation should be recorded. If not, then the operation comes to its end. If, however, it is indicated by step 106 that the conversation of this phone call should be recorded, then step 108 creates a file identified by a unique file name. Step 110 records the conversation data which is written to the just-created file, as per step 112. Step 114 then monitors whether the recording of the conversation data should be stopped. If not, then the writing operation of step 112 continues. However, if the recording is to stop, for reasons explained below, then step 116 closes the file which is then migrated, per step 118, to the server with its mass storage.

Returning now to step 101, if a signal is received from phone system 7 but it is not identified as a call start signal, then step 120 checks whether it is a call end signal. If it is, then step 122 sends an acknowledgement signal to phone system 7 and also sends a stop recording signal, per step 124, to recording system 15 to affect step 114.

Figure 6:
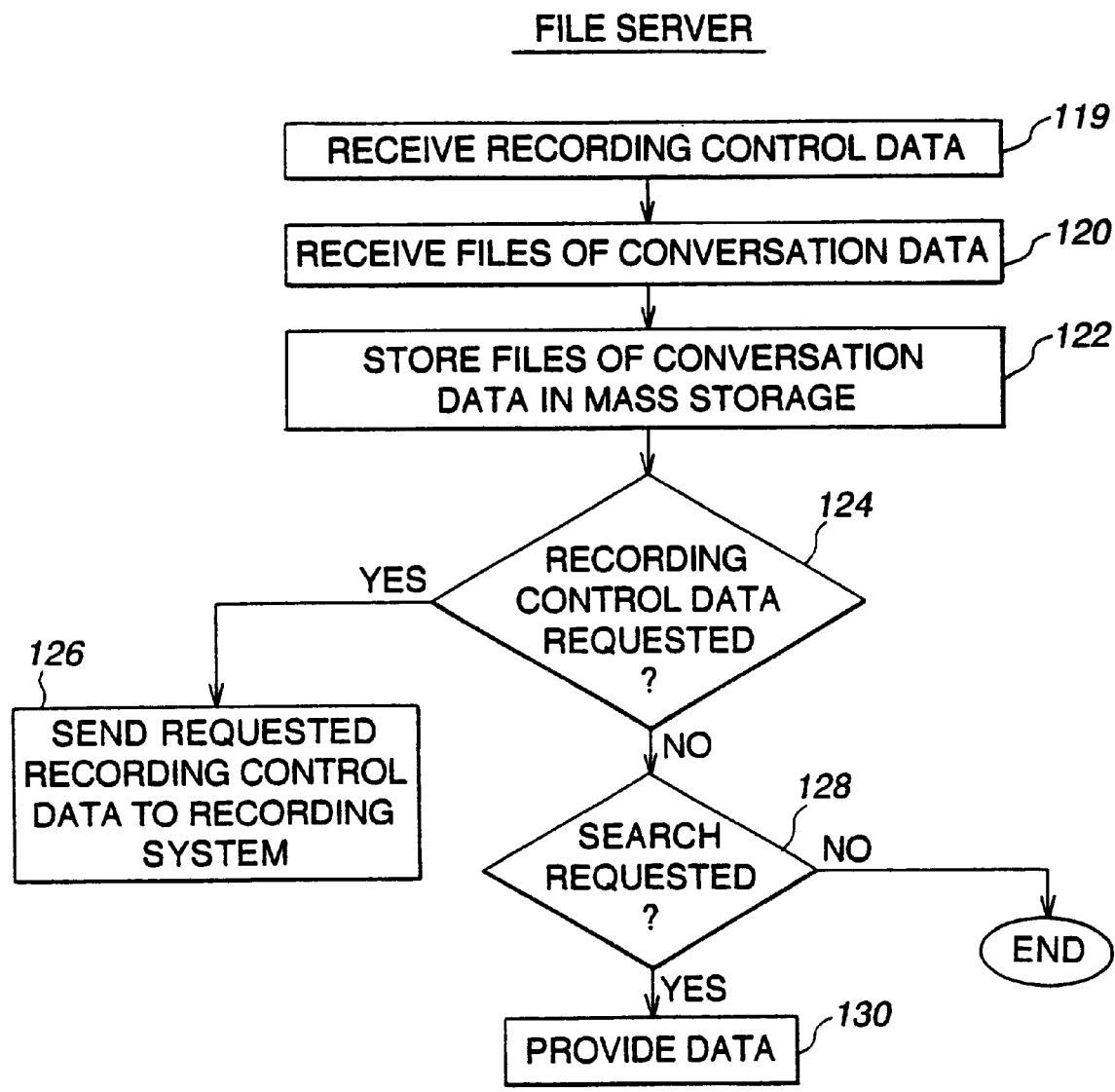
FIG. 6 is a flow chart for operating the file server of FIG. 1.

FIG. 6 depicts a flow chart for file server 21. Specifically, step 119 receives and stores the recording control data from workstation 19. In step 120, file server 21 obtains the files of telephone conversations recorded by recording system 15. Such files include the file name, the conversation data stored therein, and the call-related data associated with that particular call. The files are stored by file server 21 in the mass storage juke box, as per step 122. If step 124 determines that recording control data has been requested by the recording system 15, step 126 retrieves and sends it. If step 128 determines that a request has been obtained from workstation 19 for a report or a designated phone conversation as per particular search parameters, file server 21 carries out the search and provides the data as per step 130.

In a second embodiment of the invention, no direct connection is provided between phone system 7 and recording system 15. In other words, line 20 (FIG. 1) is not used. Such a situation will arise when a phone system 7 already exists before the remaining components of telephone apparatus 1 are obtained, and compatibility may be a problem. With such an arrangement, it is not possible to provide all of the access control data to the recording system from the phone system. Thus, the destination number and PIN number entered by the caller cannot be fed to the recording system. However, although the PIN number (and of course the origination number) cannot be provided to recording system 15, the destination number can be derived from the DTMF tones via lines 17. Thus, control of whether or not to record can be based on the destination number and, of course, other parameters readily available to the recording system, such as date, day of the week, time of day, etc. Based on these parameters, steps 103, 104, 106, 108, 110, 112, 114, 116 and 118 of FIG. 5 can be carried out. Of course, step 114 will not be based on receipt of a call end signal from phone system 7 but, rather, on sensing that the phone has been placed on-hook.

Although a detailed description of preferred embodiments of the invention has been provided above, various modifications thereto will be readily apparent to anyone with ordinary skill in the art. For example, incoming calls can also be handled by the telephone apparatus by using the "caller ID" feature to determine the telephone number from which the incoming call was placed. That data can be used to control access as well as whether to record the conversation. Also, the validation check as to one or more of the origination number, PIN number and destination number can be done at the facility rather than at the central office. In addition, the capability for prepaid calling can be provided. More specifically, rather than handling the outgoing calls on only a collect call billing basis, each inmate can prepay a certain amount into an account. Then, validation step 46 (FIG. 3) can be replaced with a check on the balance left in the inmate's prepaid calls account. If insufficient funds remain, the call is denied. Also, if the balance is exceeded during a call, the call could be terminated. Moreover, another possible modification involves the situation if a destination number is dialed more than a preset threshold of times, that destination number will be automatically recorded thereafter. Another modification is to add a self-learning capability so that some data can be entered automatically into the system rather than being inputted manually. For example, rather than manually entering a list of telephone numbers that the inmate is permitted to call, this list can be generated automatically by including in it all the numbers called by that inmate during a given period (e.g. one month). These and other such modifications are intended to fall within the scope of the present invention as defined by the following claims.

We claim:

1. A telephone apparatus for controlling access by telephones located at a facility to a public switched telephone network (PSTN) and recording selected phone conversations, comprising:

means for storing access control data and recording control data;

means for providing call-related data particular to an attempted call being made from one of the telephones;

a phone system located at the facility, including access control means for providing selected access from said one telephone to the PSTN by connecting the attempted call based on a comparison of said access control data with said call-related data, wherein said access control means generates a valid signal when access to the PSTN is about to be gained by connecting the attempted call;

recording means coupled to the phone system for recording conversation data generated when an attempted call has been connected to the PSTN;

recording control means for selecting which connected calls are to be recorded based on a comparison of said call-related data with said recording control data;

storage means for storing said conversation data of connected calls selected to be recorded; and means for transferring said call-related data to said recording control means upon generation of said valid signal.

2. The telephone apparatus of claim 1, wherein said access control means connects the attempted call only if an acknowledgement signal is received from said recording control means that said call-related data has been transferred thereto.

3. The telephone apparatus of claim 2, wherein said conversation data is recorded and stored by said recording means, and then transferred to said storage means after said connected call has been completed.

4. The telephone apparatus of claim 3, wherein said call-related data is stored by said storage means in association with said stored conversation data for each connected call.

5. The telephone apparatus of claim 1, wherein said storage means includes a mass storage device.

6. The telephone apparatus of claim 1, wherein said storage means includes a file server coupled to a mass storage device.

7. The telephone apparatus of claim 6, wherein said mass storage device is an optical juke box.

8. The telephone apparatus of claim 1, wherein said recording control data is stored in said storage means.

9. The telephone apparatus of claim 8, wherein said recording control means retrieves said recording control data from said storage means to conduct said comparison with the call-related data.

10. The telephone apparatus of claim 4, further comprising means for searching the data stored in said storage means based on designated search parameters to retrieve conversation data of a designated recorded call.

11. The telephone apparatus of claim 10, wherein said search parameters are related to said call-related data.

12. The telephone apparatus of claim 1, further comprising means for searching the data stored in said storage means based on designated search parameters to retrieve conversation data of a designated recorded call.

13. The telephone apparatus of claim 1, wherein said phone system is connected to the PSTN by at least one outside-line extending into the facility, and wherein said recording means is connected to the at least one outside line.

14. The telephone apparatus of claim 1, wherein internal lines respectively connect the telephones to the phone system, and further comprising means for detecting signals generated by said one telephone on a respective internal line to determine the destination number.

* * * * *